(12) United States Patent
Kimberley

(10) Patent No.: US 7,137,644 B2
(45) Date of Patent: Nov. 21, 2006

(54) COLLAPSIBLE GOLF CART (76) Inventor: Kevin Kimberley, 826-1641 Lonsdale Avenue, North Vancouver, British Columbia (CA) V7M 2J5

( * ) Notice: Subject to any disclaimer, the term of this patent is extended or adjusted under 35 U.S.C. 154(b) by 0 days.

(21) Appl. No.: 11/067,224

(22) Filed: Feb. 28, 2005

(65) Prior Publication Data
US 2006/0192366 A1 Aug. 31, 2006

(51) Int. Cl.
B62B 1/00 (2006.01)
(52) U.S. Cl. .................. 280/651; 280/DIG. 6; 280/654
(58) Field of Classification Search .......... 280/DIG. 5, 280/DIG. 6, 646, 652, 38, 40, 654, 651, 62, 280/659, 639, 642
See application file for complete search history.

(56) References Cited

U.S. PATENT DOCUMENTS

| | | | | |
|---|---|---|---|---|
| 4,106,583 A | * | 8/1978 | Nemeth | 280/DIG. 5 |
| 4,252,870 A | * | 2/1981 | Nemeth | 429/84 |
| 4,289,324 A | * | 9/1981 | Nemeth | 280/38 |
| 4,657,100 A | * | 4/1987 | Lewis | 280/38 |
| 4,705,293 A | * | 11/1987 | Hart | 280/DIG. 5 |
| 4,784,401 A | | 11/1988 | Reguet | |
| 5,526,894 A | * | 6/1996 | Wang | 180/65.1 |
| 5,582,419 A | | 12/1996 | Lucia et al. | |
| 5,857,684 A | | 1/1999 | Liao et al. | |
| 6,698,789 B1 | | 3/2004 | Reimers et al. | |
| 6,719,319 B1 | * | 4/2004 | Liao | 280/654 |
| 6,863,297 B1 | * | 3/2005 | Shapiro | 280/646 |
| 6,886,852 B1 | * | 5/2005 | Cheng et al. | 280/651 |
| 6,969,078 B1 | * | 11/2005 | Liao | 280/38 |

* cited by examiner

Primary Examiner—Hau Phan
(74) Attorney, Agent, or Firm—Norman M Cameron (57) ABSTRACT A golf cart including a frame having a first portion and a second portion. A front wheel mount is pivotally connected to the first portion of the frame and is pivotable about a first axis. A front wheel is rotatably connected to the front wheel mount, allowing for rotation of the front wheel about a second axis that is generally perpendicular to the first axis. The front wheel mount further allows for arcuate movement of the front wheel about the first axis. There is a pair of rear wheel members, each rear wheel member having a first end and a second end, the first end of each rear wheel member is pivotally connected to the second portion of the frame. There is a pair of rear wheels, each rear wheel is rotatably connected to the second end of one of each of the rear wheel members. A handle is connected to the second portion of the frame. A collapsing mechanism is moveable between a first position and a second position. The collapsing mechanism is connected to the first portion of the frame and to the rear wheel members. The front wheel moves away from the second portion of the frame when the collapsing mechanism is moved towards the first position, and the front wheel moves towards the second portion of the frame when the collapsing mechanism is moved towards the second position. The rear wheels move away from the frame when the collapsing mechanism is moved towards the first position, and the rear wheels move towards the frame when the collapsing mechanism is moved towards the second position.

19 Claims, 14 Drawing Sheets

COLLAPSIBLE GOLF CART

BACKGROUND OF THE INVENTION

The present invention relates to collapsible carts, and in particular to collapsible golf carts, which collapse into a compact configuration to facilitate transportation of the golf carts to and from the golf course.

Golf is a sport which requires its players to have a large selection of clubs available for use in a variety of situations. As a consequence, players frequently use a golf cart to transport their selection of clubs during a game of golf. However, golf carts are often bulky, making them difficult to store and less easily transportable to and from the golf course than may be desired.

To overcome this problem collapsible golf carts have been developed. Such carts often include foldable or removable parts. However, these collapsible golf carts tend to be cumbersome to collapse and the compactness of the collapsed configuration is limited. There is thus a need for a golf cart that can be collapsed easily into a very compact structure.

SUMMARY OF THE INVENTION

According to one aspect of the invention, there is provided a collapsible golf cart. The golf cart comprises a frame having a first portion and a second potion. A front wheel mount is pivotally connected to the first portion of the frame and is pivotable about a first axis. A front wheel is rotatably connected to the front wheel mount, allowing for rotation of the front wheel about a second axis that is generally perpendicular to the first axis. The front wheel mount further allows for arcuate movement of the front wheel about the first axis. There is a pair of rear wheel members, each rear wheel member having a first end and a second end. The first end of each rear wheel member is pivotally connected to the second portion of the frame. There is a pair rear wheels, each rear wheel is rotatably connected to the second end of one of each of the rear wheel members. A handle is connected to the second portion of the frame.

There is also a collapsing mechanism that is moveable between a first position and a second position. The collapsing mechanism is connected to the first portion of the frame and to the rear wheel members. The front wheel moves away from the second portion of the frame when the collapsing mechanism is moved towards the first position, and the front wheel moves towards the second portion of the frame when the collapsing mechanism is moved towards the second position. The rear wheels move away from the frame when the collapsing mechanism is moved towards the first position, and the rear wheels move towards the frame when the collapsing mechanism is moved towards the second position.

The cart may include a first link rod. The link rod may connect the collapsing mechanism to the first portion of the frame. The cart may also include a second link rod. The second link rod may connect one of the rear wheel members to the collapsing mechanism. Each rear wheel member may include a first strut and a second strut. The first strut may be longer than the second strut. The collapsing mechanism may be a sleeve. The collapsing mechanism may also be slidable along the frame.

The cart may also further include a locking mechanism. The locking mechanism may maintain the cart in a first configuration when the collapsing mechanism is in the first position. However, the locking mechanism may also maintain the cart in a second configuration when the collapsing mechanism is in the second position. The cart may also further include a second locking mechanism. The second locking mechanism may prevent the front wheel mount from pivoting about the first axis when engaged. The second locking mechanism may also prevent arcuate movement of the front wheel about the first axis when engaged. The cart may also further include a third locking mechanism. The handle may be pivotally connected the frame. The third locking mechanism may prevent the handle from pivoting when engaged.

The cart may also further include a brake. The brake may prevent the front wheel from rotating about the second axis when engaged. The cart may also further include a include a brake control. The brake control may be located on the handle. The brake may be engaged by the brake control. The cart may also further include a cup holder. The cup holder may be connected to the handle. The cup holder may also be integral to the handle.

According to another aspect of the invention, there is provided a collapsing mechanism for collapsing a golf cart from a first configuration to a second configuration. The golf cart includes a frame with a first portion and a second portion. The first portion is pivotally connected to the second portion. A front wheel is rotatably connected to the first portion of the frame. A pair of rear wheel members are pivotally connected to the second portion frame. A pair of rear wheels are rotatably mounted on one of each of the rear wheel members.

The collapsing mechanism includes a means for pivoting the first portion of the frame away from or towards the second portion of the frame, and a means for moving the rear wheels away from or towards the frame. The collapsing mechanism may also including a means for locking the golf cart in the first configuration or in the second configuration.

The collapsing mechanism may be moveable between a first position and a second position. The golf cart may be in the first configuration when the collapsing mechanism is in the first position. However, the golf cart may also be in the second configuration when the collapsing mechanism is in the second position.

The means for pivoting the first portion of the frame away from or towards the second portion of the frame may include a link rod. The link rod may connect the collapsing mechanism to the first portion of the frame. The link rod may also move the first portion of the frame away from the second portion of the frame when the collapsing mechanism is moved towards the first position. The link rod may also move the first portion of the frame towards the second portion of the frame when the collapsing mechanism is moved towards the second position.

The means for moving the rear wheels away from or towards the frame may include a second link rod. The second link rod may connect the collapsing mechanism to one of the rear wheel members. The second link rod may also move the rear wheel members and one of the rear wheels away from the frame when the collapsing mechanism is moved towards the first position. The second link rod may also move said one of the rear wheel members and the rear wheels towards the frame when the collapsing mechanism is moved towards the second position.

According to still a further aspect of the invention, there is provided a method for collapsing a golf cart from a first configuration to a second configuration. The golf cart includes a frame with a first portion and a second portion. The first portion is pivotally connected to the second portion. A front wheel mount is pivotally connected to the first portion of the frame. A front wheel is rotatably mounted on the front wheel mount. The front wheel is allowed arcuate movement about the first axis and is rotatable about a second axis substantially perpendicular to the first axis. A pair of rear wheel members are pivotally connected to the frame. A pair of rear wheels are each rotatably mounted on one of each of the rear wheel members. A handle is pivotally connect to the second portion of the frame.

The method of collapsing the golf cart includes moving the front wheel about the first axis, pivoting the rear wheel members towards the frame, pivoting the first portion of the frame towards the second portion of the frame, and pivoting the handle towards the second portion of the frame.

The front wheel may be moved substantially 90 degrees about the first axis. The rear wheel members may be pivoted towards the frame, causing the rear wheels to move from being substantially aligned along a pair of parallel axes to being substantially aligned along a pair of intersecting axes. The first portion of the frame may be pivoted from a position substantially perpendicular to the second portion of the frame, to a position substantially parallel to the second portion of the frame. The handle may be pivoted to a position between the rear wheels. The front wheel may be moved to a position generally perpendicular to the rear wheels when the rear wheels are substantially aligned along a pair of axes. The front wheel may also further be moved to a position adjacent to the rear wheels and between the axes.

The invention offers advantages over the prior art by increasing the compactness of the collapsed configuration.

DETAILED DESCRIPTION OF THE PREFERRED EMBODIMENT

Figure 1:
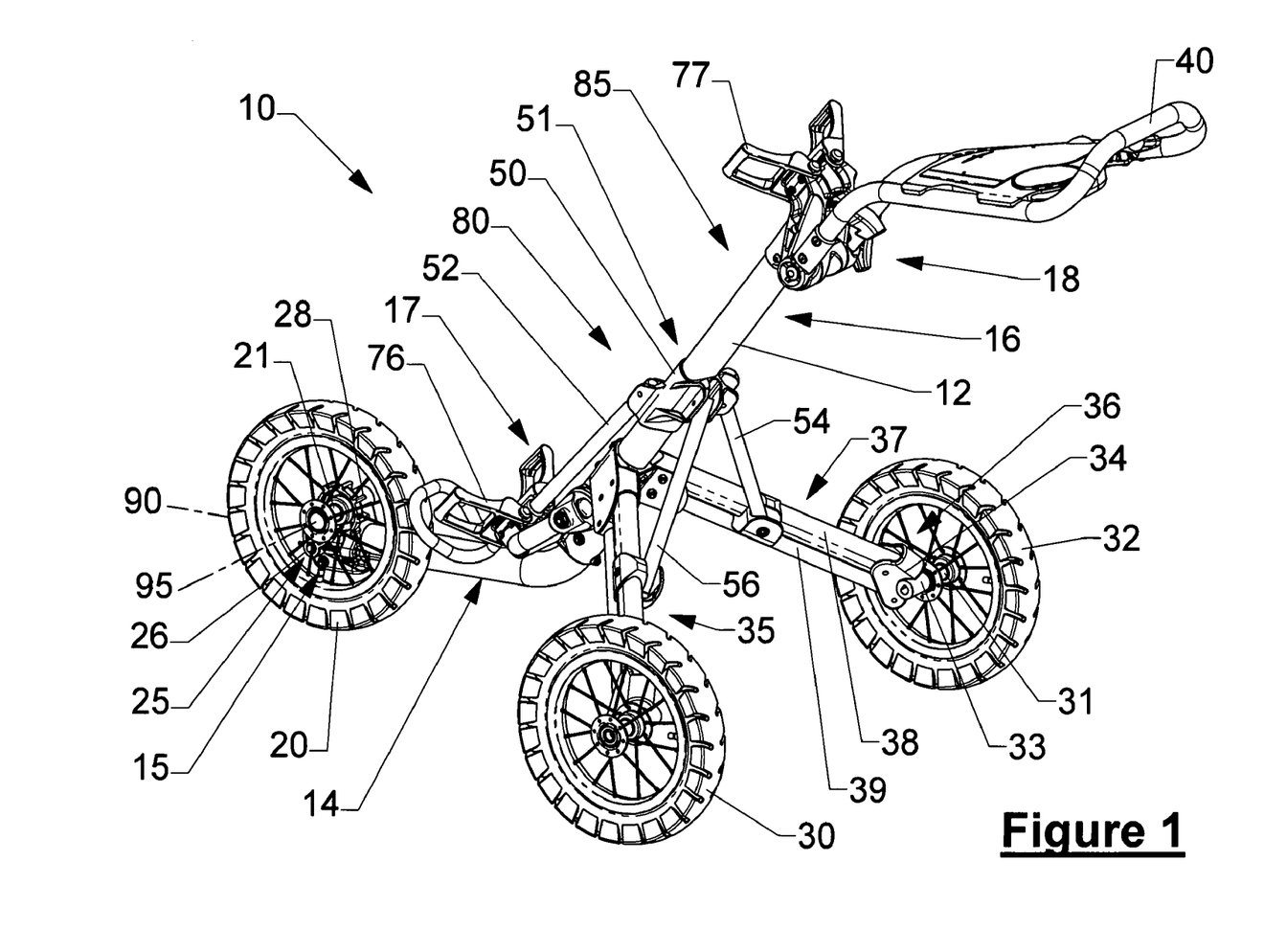
FIG. 1 is a rear perspective view of a collapsible golf cart, according to an embodiment of the invention, shown in the extended position.
Figure 1A:
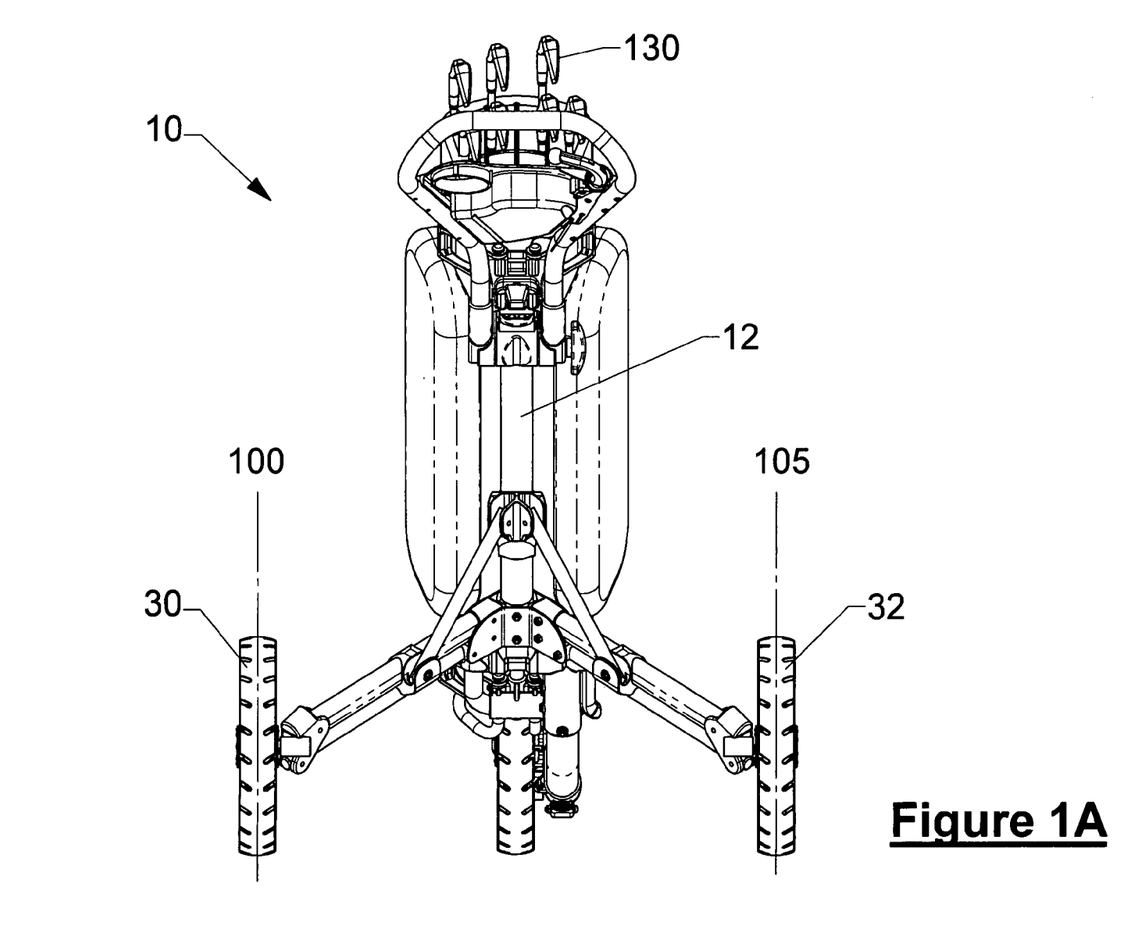
FIG. 1A is a rear perspective view of thereof.

Referring to the drawings, and first to FIG. 1, this shows a collapsible golf cart 10 in an extended configuration, which is the configuration of normal usage. The golf cart includes a frame 12. The frame has a first portion 14 which is pivotally connected to a second portion 16. In this example, the frame is tubular with the first portion 14 being generally horizontal in use and the second portion 16 being generally vertical and inclined rearwards. There are two clamps 76 and 77 connected to bottom end 17 and top end 18 of the second portion of the frame 16. The clamps act to secure a golf bag 130 to the cart 10, as shown in FIG. 1A. Nylon straps (not shown) may be used to secure the bag.

Figure 2:
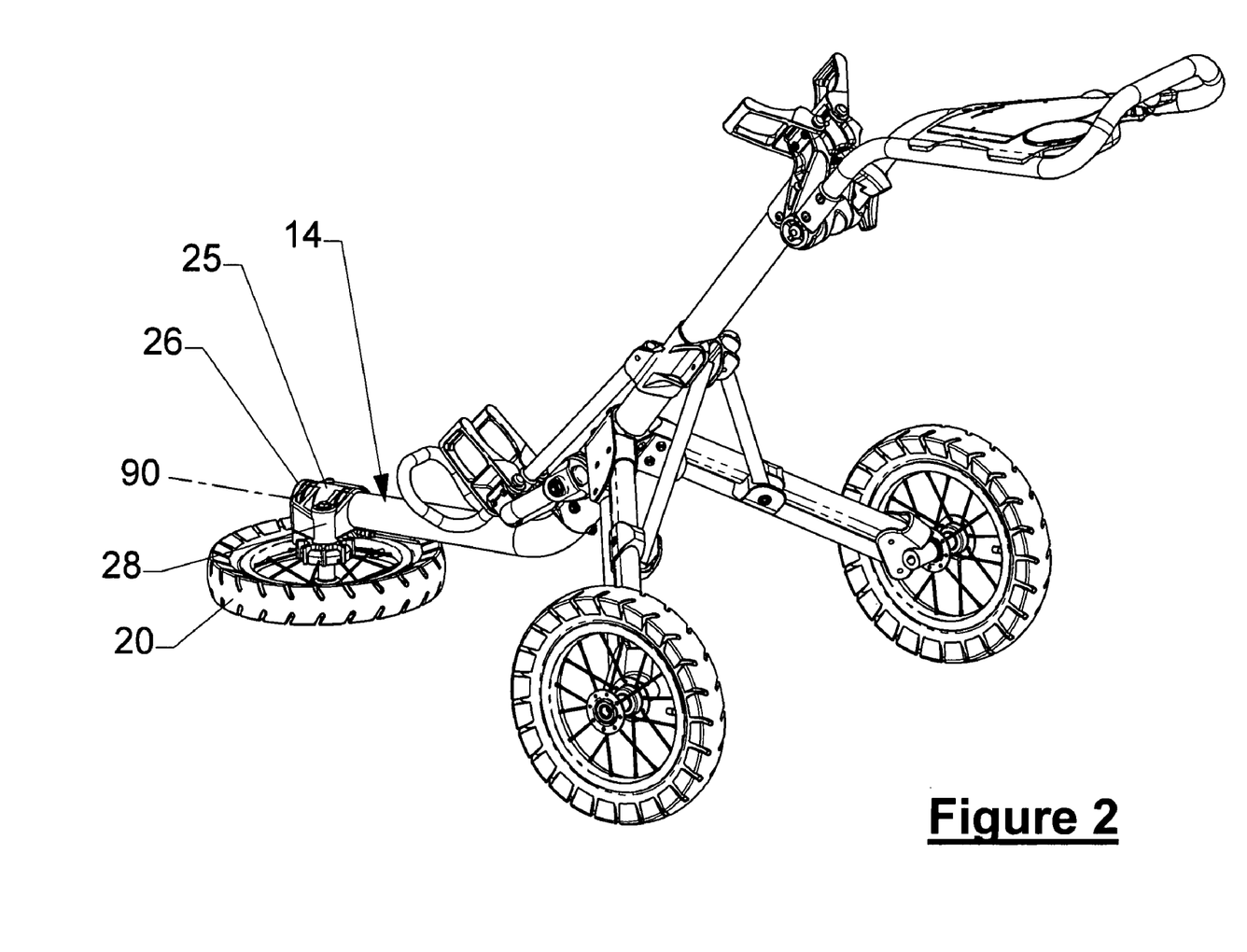
FIG. 2 is a rear perspective view thereof, shown in an extended position with the front wheel moved about the first axis.

A front wheel mount 25 is pivotally connected to the first portion of the frame 14 and is pivotable about a first axis 90. The front wheel mount 25 includes a sleeve-like portion 26, which extends pivotally about forward end 15 of the first portion of the frame 14, and a cylindrical projection 28, which receives a front wheel axle 21 as shown best in FIG. 2. A front wheel 20 is therefore rotatably mounted on the front wheel mount 25, and is rotatable about a second axis 95. The front wheel 20 is also allowed arcuate movement about the first axis 90, as shown in FIG. 2.

Rear wheel members 35 and 37 are pivotally connected to the bottom end 17 of the second portion of the frame 16. The rear wheel members 35 and 37 are comprised of a first strut 38 and second strut 39, shown for rear wheel member 37 in FIG. 1. In this example, the struts 38 and 39 are tubular. The first strut 38 is longer than the second strut 39. The struts 38 and 39 are aligned parallel to each other and are received by a rear wheel mount 34 located at the outer end 36 of the rear wheel member 37. A pair of rear wheels 30 and 32 are each rotatably mounted on one of each of the rear wheel members 35 and 37 at the rear wheel mount 34, shown for rear wheel member 37. The rear wheel mount 34 includes a cylindrical projection 33 which receives a rear wheel axle 31, shown for rear wheel 32.

Figure 7:
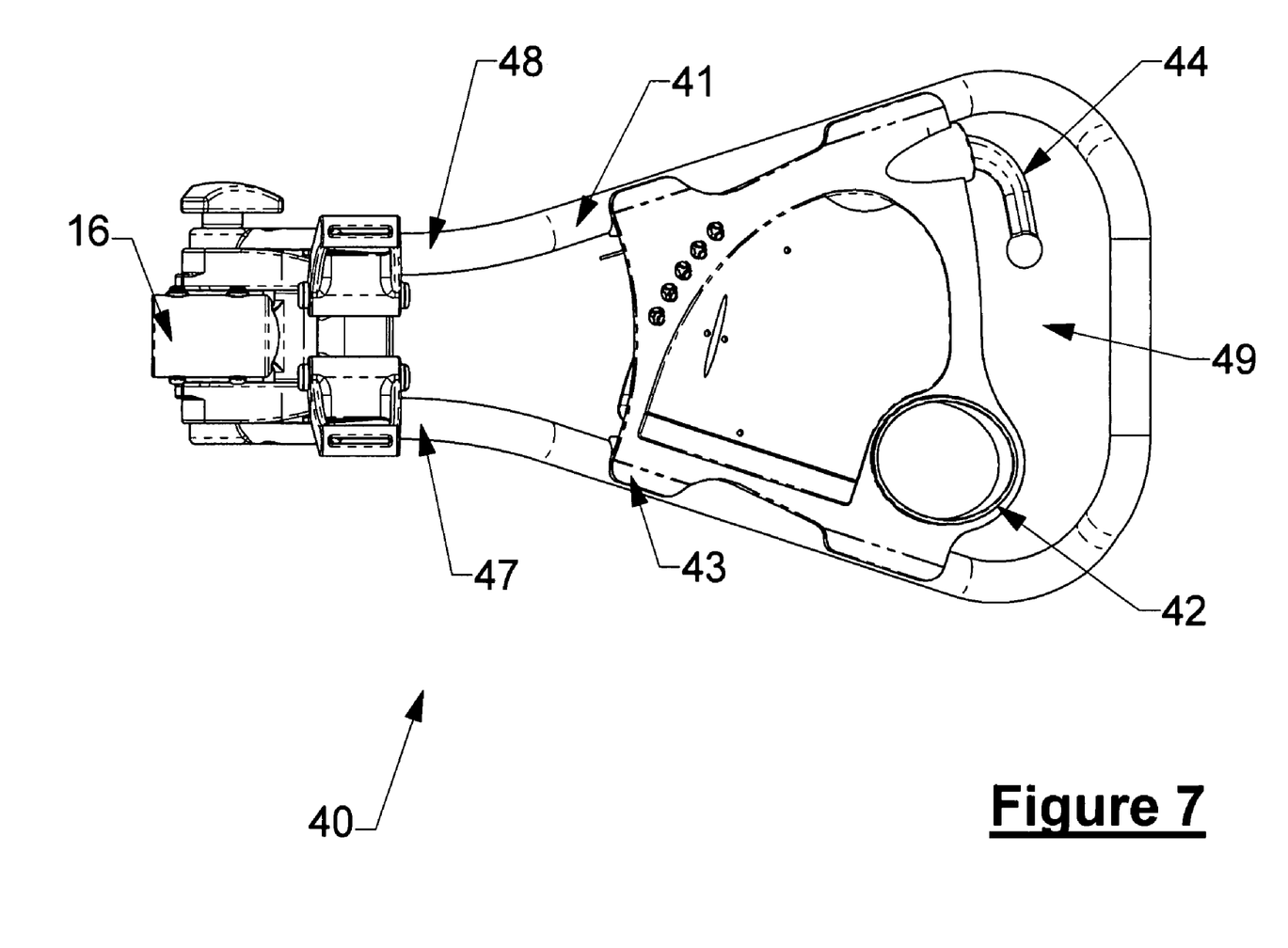
FIG. 7 is a top perspective view of the handle.
Figure 10:
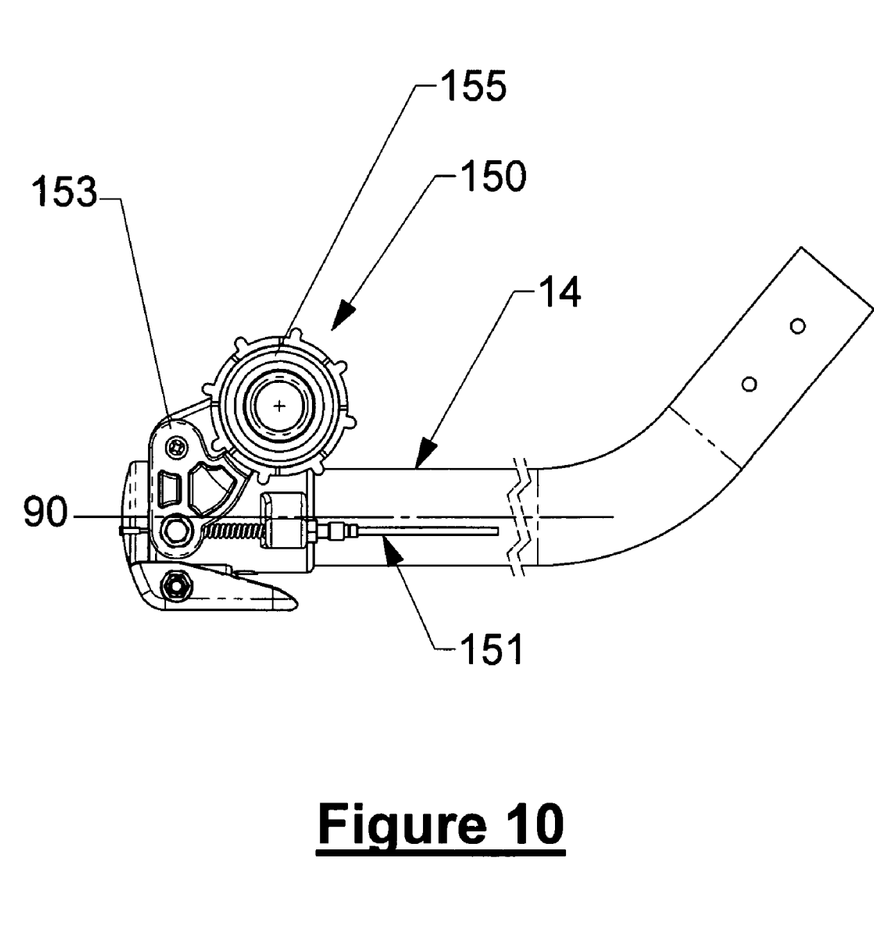
FIG. 10 is a side perspective view of the brake.
Figure 10A:
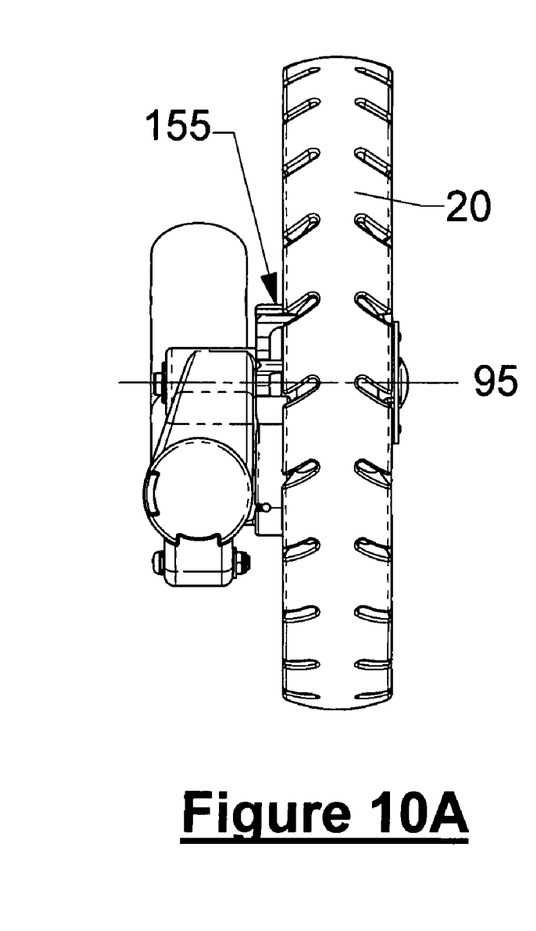
FIG. 10A is a front perspective view of the thereof.

A handle 40 is pivotally connected to the top end 18 of the second portion of the frame 16. In this example the handle 40 is generally horizontal in use. The handle, shown in better detail in FIG. 7, is comprised of a tubular, loop-like structure 41. The ends of the loop-like structure 47 and 48 are connected to the second portion of the frame 16. A planar member 43 is connected to the loop-like structure 41 and is contained within the loop 49. The planar member 43 includes a cup holder 42 and a brake control 44. The brake 150, as shown in FIG. 10, prevents the front wheel 20 from rotating about the second axis 95 when engaged. When the brake cable 151 is pulled by the brake control 44, the break hammer 153 locks into the break hub 155. This prevents rotation of the front wheel 20 around the second axis 95.

There is also a collapsing mechanism 50, shown in FIG. 1. In this example the collapsing mechanism 50 is a sleeve which is slidable along the second portion of the frame 16 between a first position 80 and a second position 85. A first link rod 52 connects the collapsing mechanism 50 to the first portion of the frame 14. Second link rods 54 and 56 connect the collapsing mechanism 50 to the rear wheel members 35 and 37.

Figure 3:
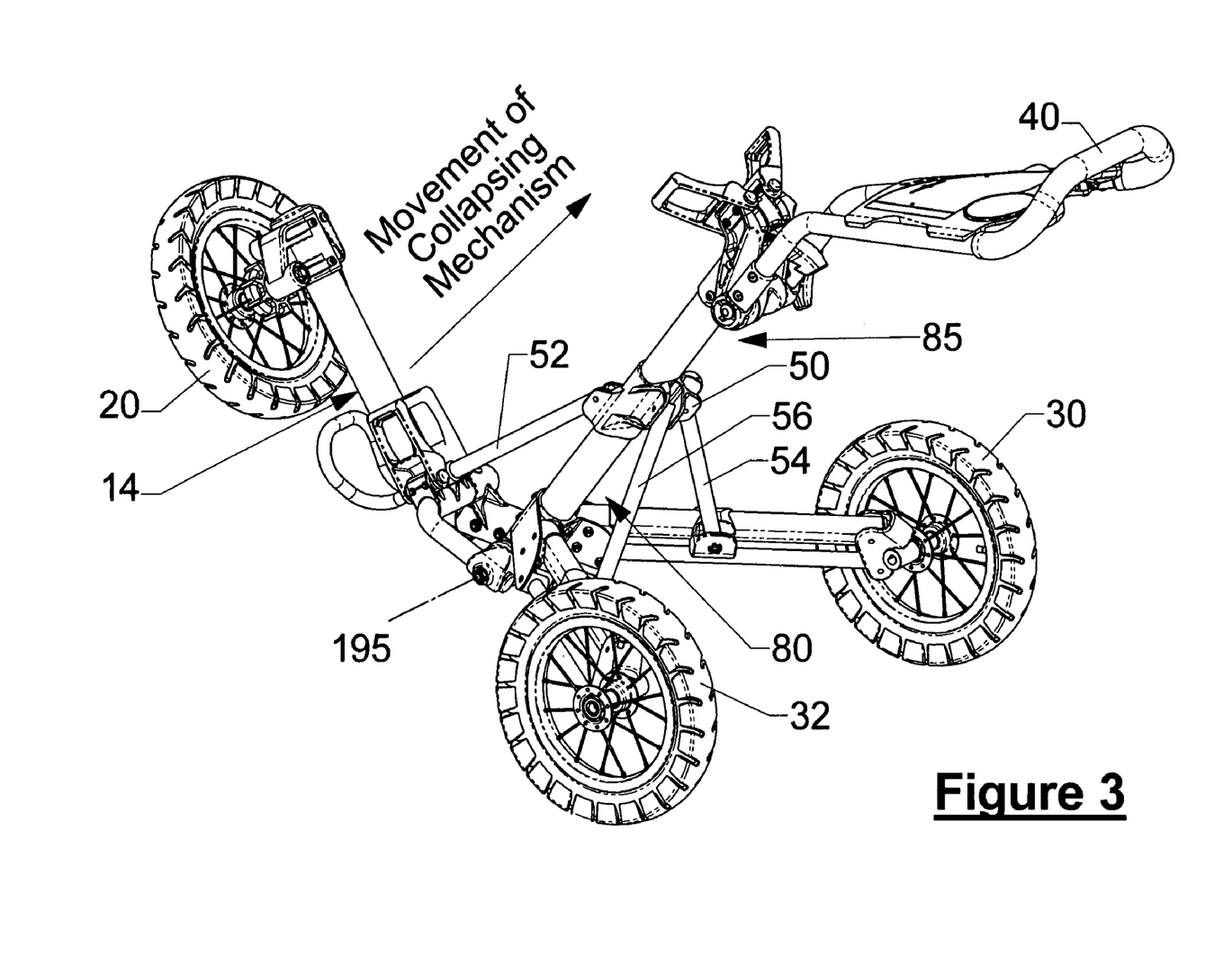
FIG. 3 is a side perspective view thereof, shown in a partially collapsed position.
Figure 4:
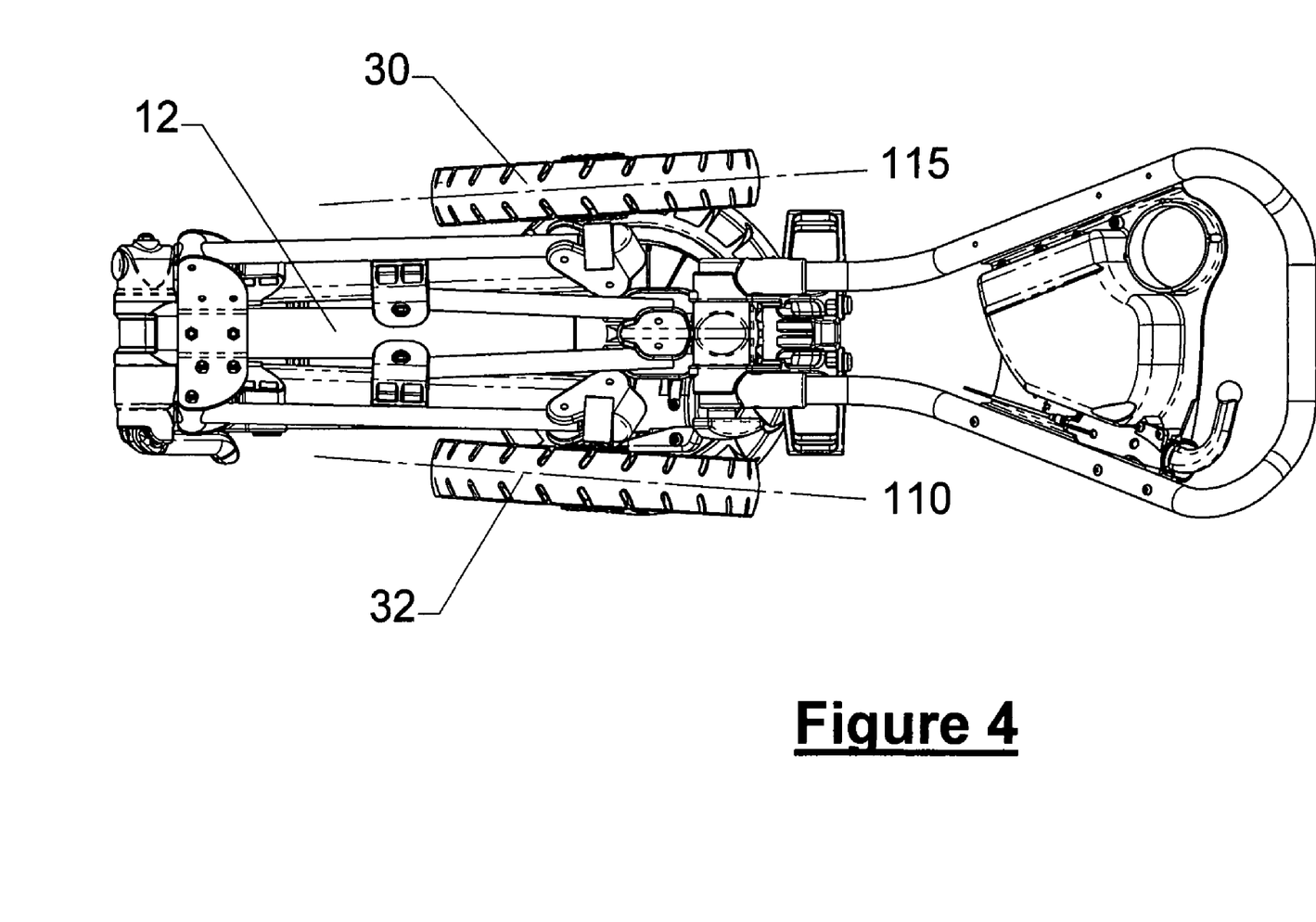
FIG. 4 is a rear perspective view thereof, shown with the front rear wheels in the collapsed position.
Figure 5:
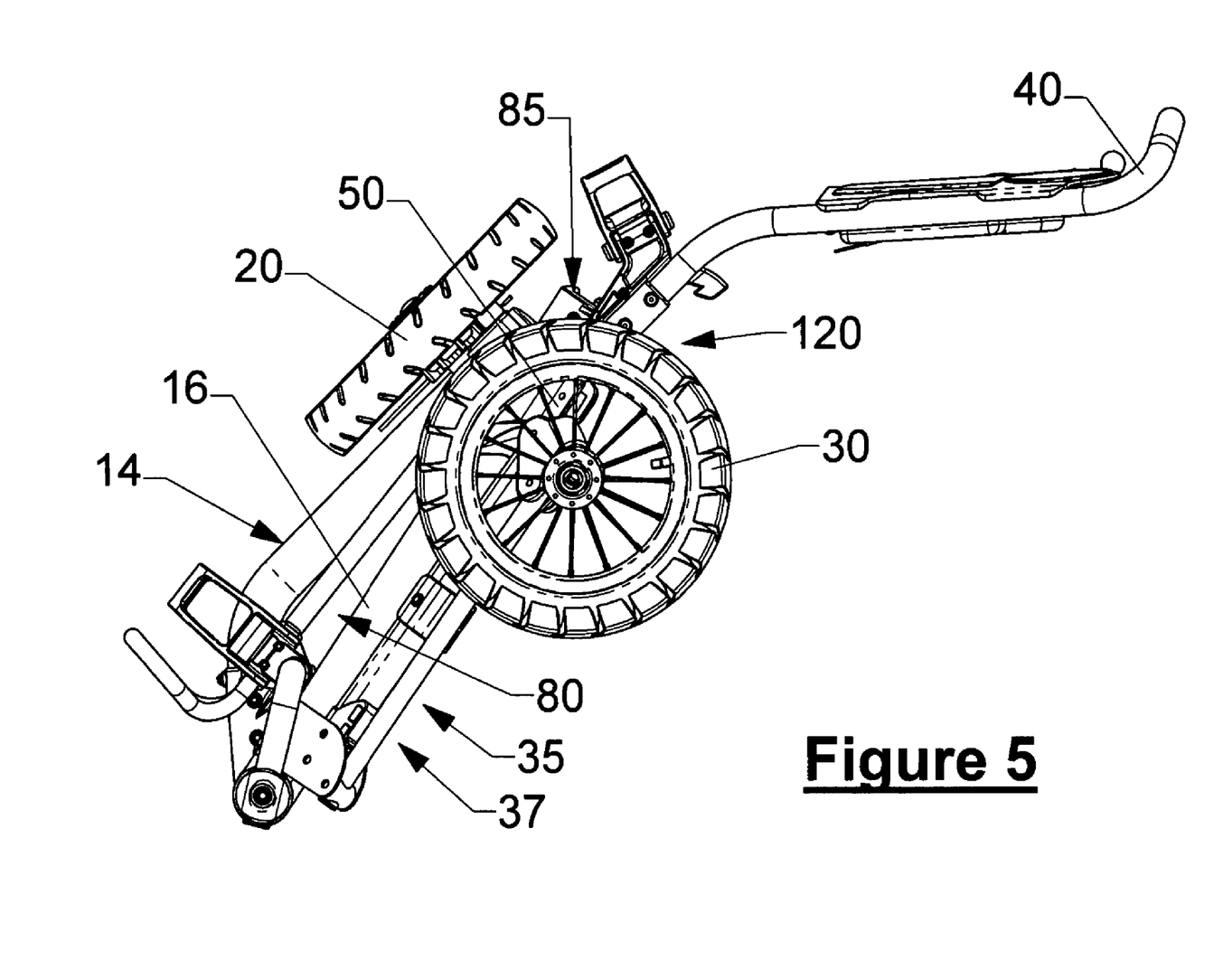
FIG. 5 is a side perspective view thereof, shown with the front wheel and rear wheels in the collapsed position.
Figure 6:
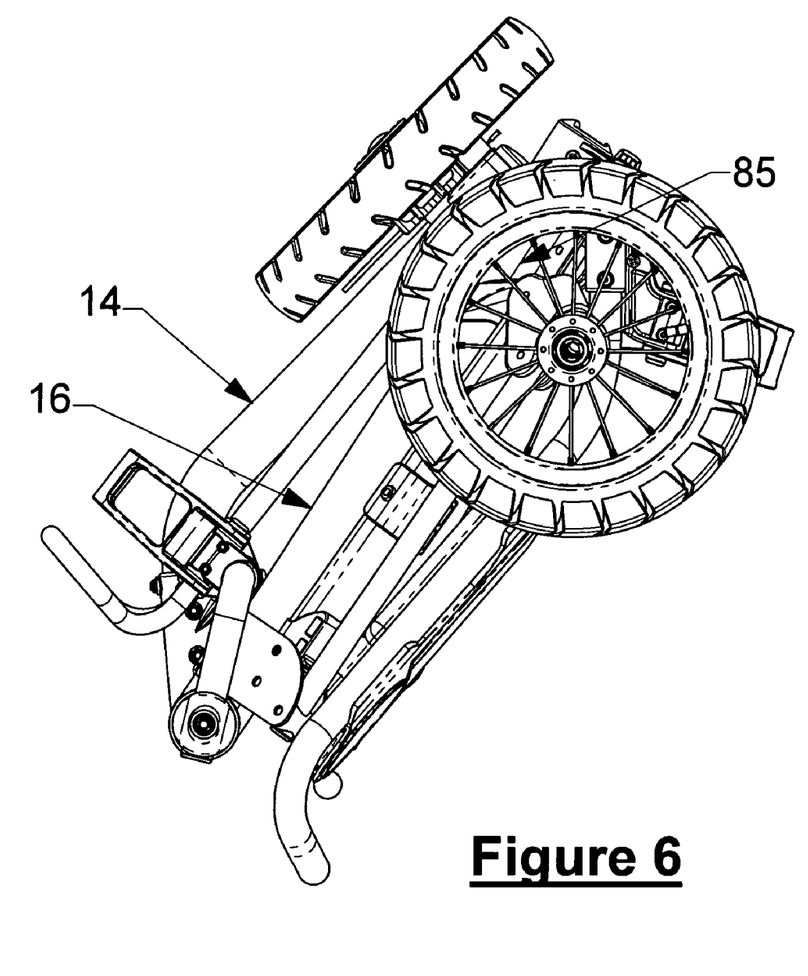
FIG. 6 is a side perspective view thereof, shown in the collapsed position.

FIG. 3 shows the cart 10 in a partially collapsed configuration. As the collapsing mechanism 50 is moved from the first position 80, shown in FIG. 1, towards the second position 85, shown in FIG. 3, the first portion 14 of the frame is moved by the first link rod 52 from a position generally perpendicular to the second portion 16 of the frame, as shown in FIGS. 1 and 2, to a position generally parallel to the first portion of the frame 16, as shown in FIGS. 5 and 6. Furthermore, as the collapsing mechanism 50 is moved from the first position 80 towards the second position 85 the rear wheel members 35 and 37 are moved by the second link rods 54 and 56 towards the second portion of the frame 16. Movement of the rear wheel members 35 and 37 causes the rear wheels 30 and 32 to move from a position substantially aligned along a pair of parallel axes 100 and 105 spaced apart from the frame 12, as shown in FIG. 1A, to a position substantially aligned along a pair of intersecting axes 110 and 115 near the frame 12, as shown in FIG. 4.

FIG. 5 shows the configuration of the cart 10 when the collapsing mechanism 50 is in the second position 85. The first portion 14 of the frame and rear wheel members 35 and 37 are aligned generally parallel to the second portion 16 of the frame. The front wheel 20 having previously been rotated substantially 90 degrees about the first axis 90, as shown in FIG. 2, is positioned generally perpendicular to the rear wheels 30 and 32 which have been moved by the rear wheel members 35 and 37 inwards towards each other and upwards towards the handle 40. In this configuration the front wheel 20 and rear wheels 30 and 32 form a cavity 120 which houses the frame 12, the rear wheel members 35 and 37, and into which the handle 40 may be folded. When the handle is folded into the cavity 120, the cart 10 is in a collapsed configuration, as shown in FIG. 6.

Figure 8:
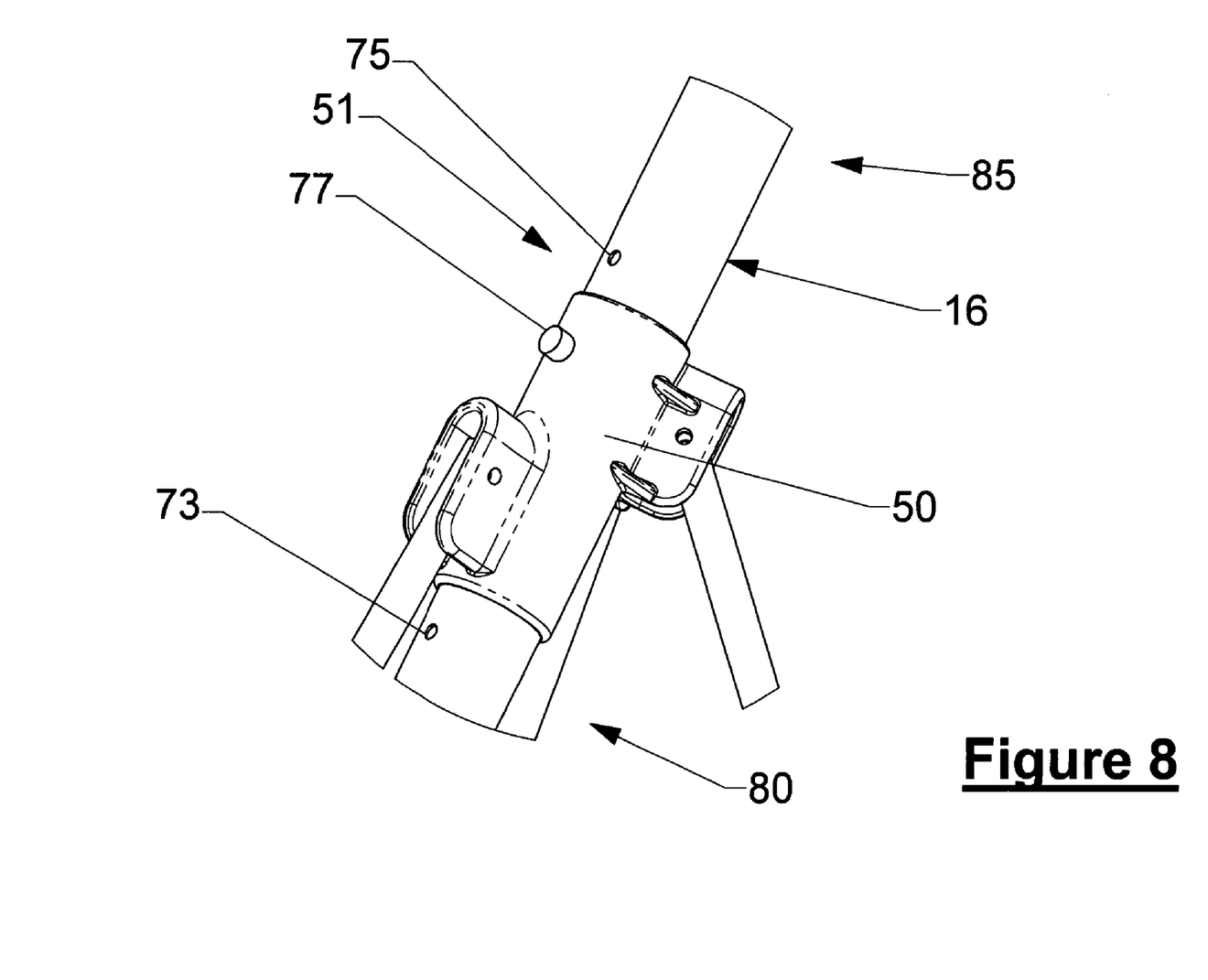
FIG. 8 is a side perspective view of the locking mechanism.

This example further includes features to prevent the cart 10 from collapsing inadvertently. A first locking mechanism 51 shown in FIG. 1, when engaged, maintains the collapsing mechanism 50 in the first position 80 or the second position 85. The first locking mechanism 51, shown in more detail in FIG. 8, is comprised of a first aperture 73 at the first position 80, a second aperture 75 at the second position 85, and a pin 77 reciprocatingly mounted through collapsing mechanism 50 and generally perpendicular to the second portion of the frame 16. When the collapsing mechanism 50 is in the first position 80, the pin 77 may be received by the first aperture 73, thereby maintaining the collapsing mechanism 50 in the first position 80. The pin 77 may also be removed from the first aperture 73, allowing the collapsing mechanism 50 to be moved towards the second position 85. When the collapsing mechanism 85 is in the second position, the pin 77 may be received by the second aperture 75, maintaining the collapsing mechanism 50 in the second position 85. It is noted that the first locking mechanism is not an essential feature of the invention.

Figure 9:
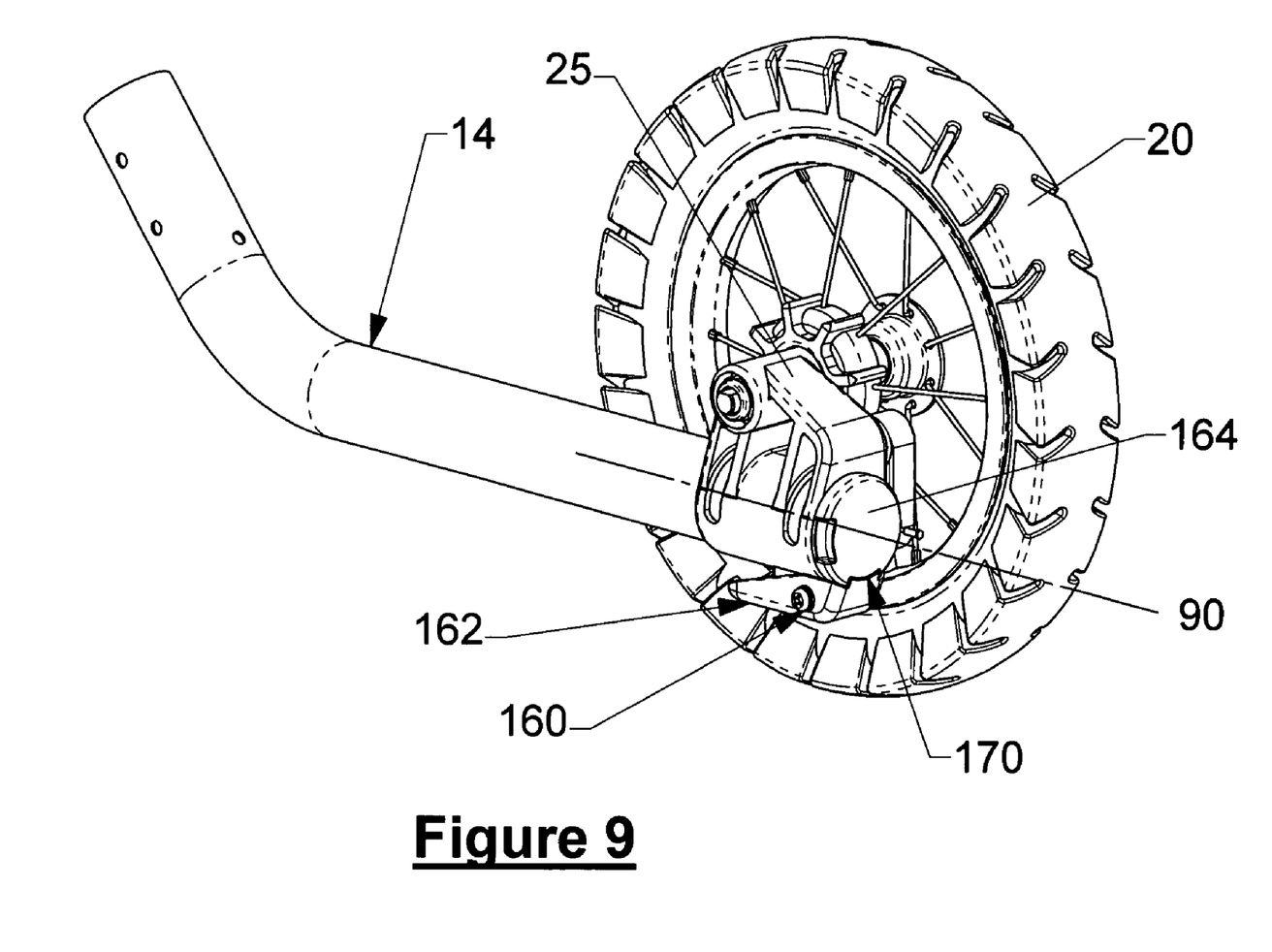
FIG. 9 is a side perspective view of the second locking mechanism, shown in the first position.
Figure 9A:
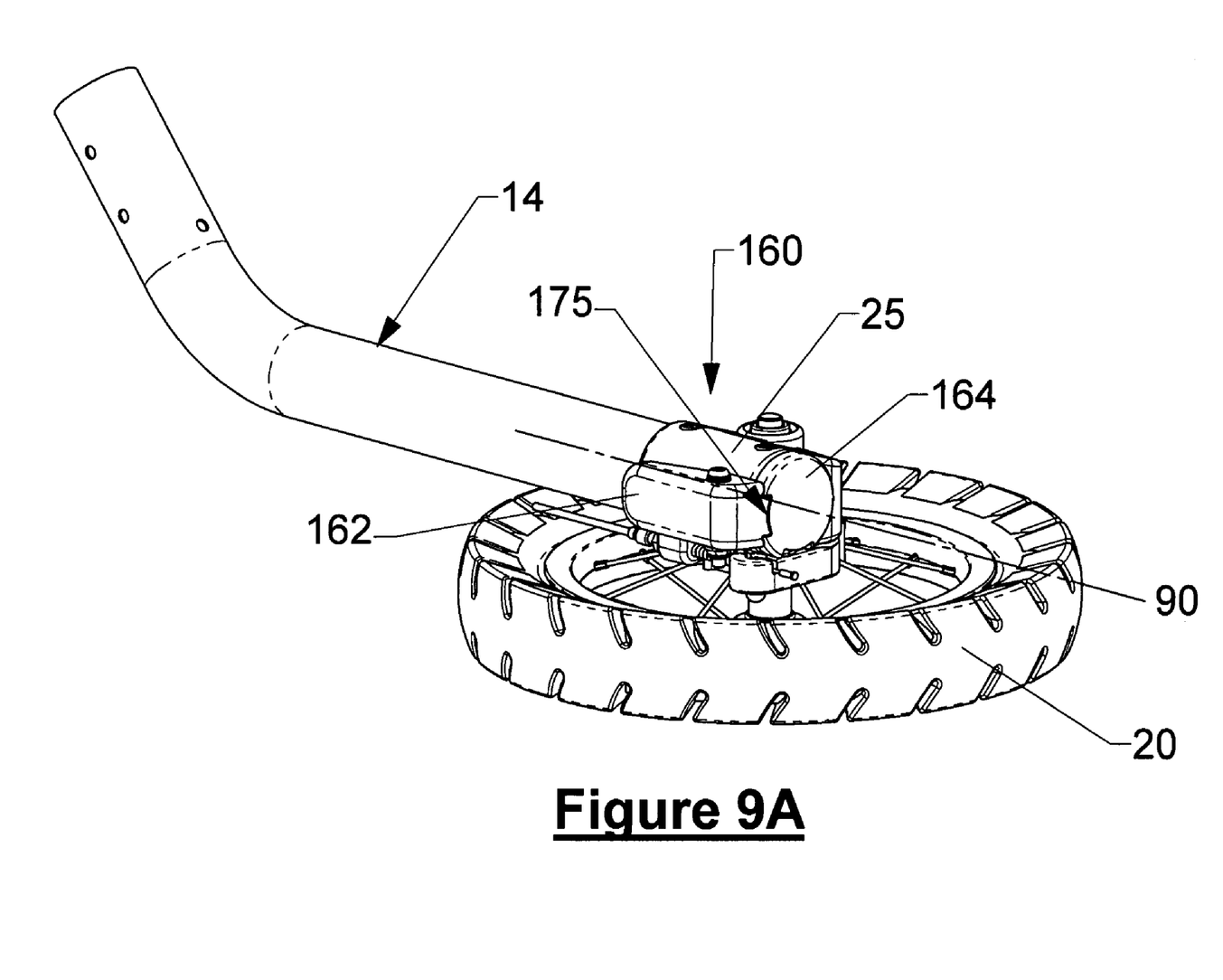
FIG. 9A is a side perspective view of thereof, shown in the second position.

A second locking mechanism 160, as shown in FIGS. 9 and 9A, when engaged, prevents the front wheel mount 25 from pivoting about the first axis 90. Thereby, also preventing arcuate movement of the front wheel 20 about the first axis 90. The second locking mechanism is comprised of a lever 162 and tab 164. The tab has a first indentation 170 and a second indentation 175. The lever 162 may be received by the first indentation 170, thereby maintaining the front wheel mount 25 in a first position, as shown in FIG. 9, or the lever may be received by the second indentation 175, thereby maintaining the front wheel mount 25 in a second position as shown in FIG. 9A. When the lever 162 is actuated the front wheel mount 25 is permitted to pivot about the first axis 90 between the first position and the second position.

Figure 11:
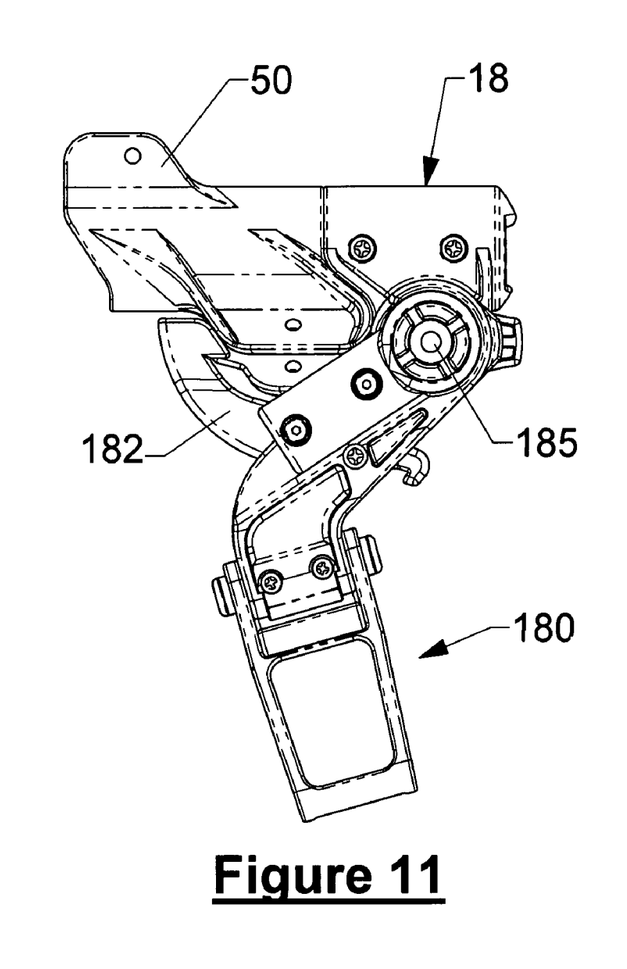
FIG. 11 is a side perspective view of the third locking mechanism.
Figure 11A:
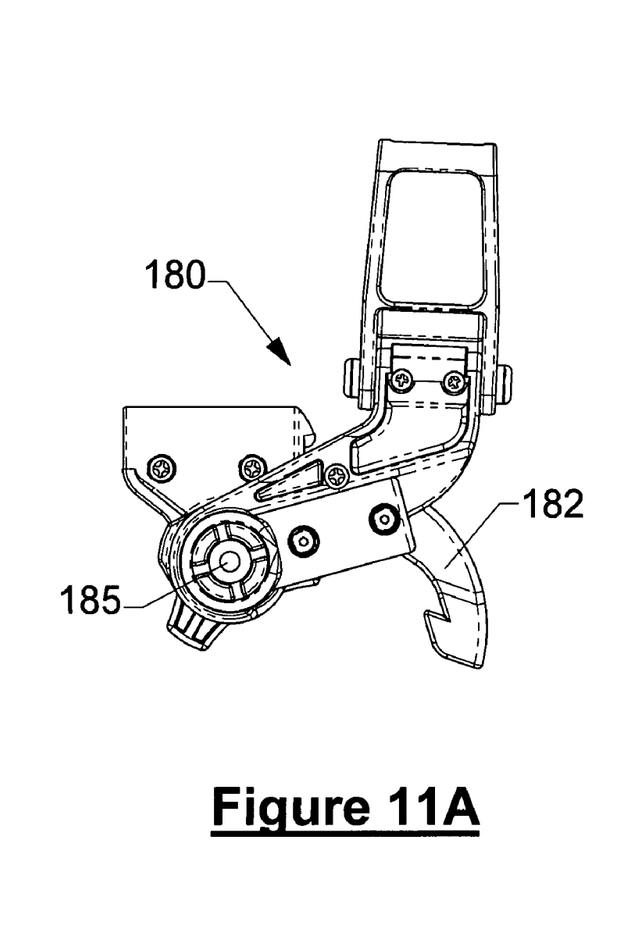
FIG. 11A, is a side perspective view, partly in fragment, thereof.

A third locking mechanism 180 as shown in FIGS. 11 and 11A prevents the handle 40 from pivoting away from or towards the frame 12 when engaged. The third locking mechanism 180 is comprised of spring activated lock arm 182 operating about a pivot 185. The lock arm 182 holds the assembly in place, as shown in FIG. 11, and the pivot 185 is locked into place with the turn of a knob (not shown) through the pivot axis.

Figure 12:
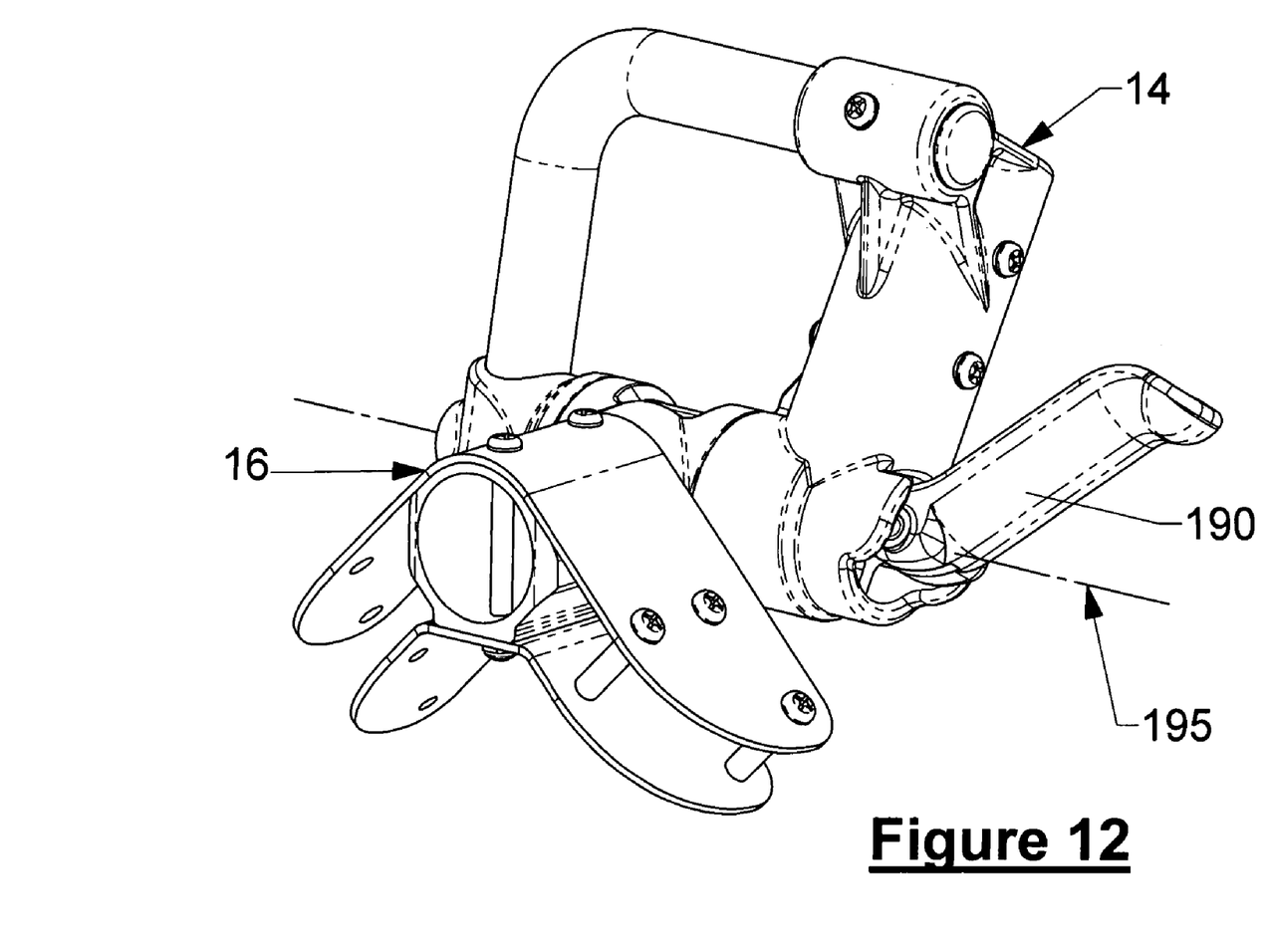
FIG. 12 is a front perspective view of the pivot between the first portion of the frame and the second portion of the frame.

In alternate embodiments of the invention a clamp lever 190, as shown in FIG. 12, may further be used to prevent pivoting of the first portion of the frame 14 and the second portion of the frame 16 about a pivot axis 195.

It will be understood by the someone skilled in the art that the cart 10 described above may also be extended from the collapsed configuration. It will further be understood by someone skilled in the art that many of the details provided above are given by way of example only and can be altered or deleted without departing from the scope of the invention as set out in the claims.

What is claimed is:

1. A collapsible golf cart comprising:
   a frame having a first portion and a second portion;
   a front wheel mount pivotally connected to the first portion of the frame, the front wheel mount being pivotable about a first axis;
   a front wheel rotatably connected to the front wheel mount, allowing for rotation of the front wheel about a second axis generally perpendicular to the first axis, the front wheel mount further allowing for arcuate movement of the front wheel about the first axis;
   a pair of rear wheel members, each said rear wheel member having a first end and a second end, the first end of said each rear wheel member being pivotally connected to the second portion of the frame;
   a pair rear wheels, each said rear wheel being rotatably connected to the second end of one of the said rear wheel members;
   a handle connected to the second portion of the frame; and
   a collapsing mechanism moveable between a first position and a second position, the collapsing mechanism being connected to the first portion of the frame and to the rear wheel members, the front wheel moving away from the second portion of the frame when the collapsing mechanism is moved towards the first position and the front wheel moving towards the second portion of the frame when the collapsing mechanism is moved towards the second position, the rear wheels moving away from the frame when the collapsing mechanism is moved towards the first position and the rear wheels moving towards the frame when the collapsing mechanism is moved towards the second position.

2. The cart as claimed in claim 1, wherein the cart further includes a locking mechanism, the locking mechanism maintaining the cart in a first configuration when the collapsing mechanism is in the first position, and the locking mechanism maintaining the cart in a second configuration when the collapsing mechanism is in the second position.

3. The cart as claimed in claim 1, wherein the first portion of the frame is pivotally connected to the second portion of the frame, the first portion moving away from the second portion when the collapsing mechanism is moved towards the first position, and the first portion moving towards the second portion when the collapsing mechanism is moved towards the second position.

4. The cart as claimed in claim 3, wherein the first portion of the frame is substantially perpendicular to the second portion when the collapsing mechanism is in the first position, and the first portion of the frame is substantially parallel to the second portion when the collapsing mechanism is in the second position.

5. The cart as claimed in claim 3, wherein the cart further includes a first link rod, the first link rod connecting the collapsing mechanism to the first portion of the frame.

6. The cart as claimed in claim 1, wherein the cart further includes a second locking mechanism, the second locking mechanism preventing pivoting of the front wheel mount and arcuate movement of the front wheel about the first axis when engaged.

7. The cart as claimed in claim 1, wherein the cart further includes a second link rod, the second link rod connecting one of said rear wheel members the collapsing mechanism.

8. The cart as claimed in claim 1, wherein each said rear wheel member includes a first strut and a second strut, the first strut being longer than the second strut.

9. The cart as claimed in claim 1, wherein the collapsing mechanism is a sleeve, the collapsing member being slidable along the frame.

10. The cart as claimed in claim 1, wherein the handle is pivotally connected the frame.

11. The cart as claimed in claim 10, wherein the cart further includes a third locking mechanism, the third locking mechanism preventing the handle from pivoting when engaged.

12. The cart as claimed in claim 1, wherein the cart further includes a cup holder, the cup holder being connected to the handle.

13. The cart as claimed in claim 12, wherein the cup holder is integral to the handle.

14. The cart as claimed in claim 1, wherein the cart further includes a brake, the brake preventing the front wheel from rotating about the second axis when engaged.

15. The cart as claimed in claim 14, wherein the cart further includes a brake control, the brake control being located on the handle, the brake being engaged by the control.

16. A combination of a collapsing mechanism and a golf cart, the golf cart including a frame with a first portion and a second portion, the first portion being pivotally connected to the second portion; a front wheel being rotatably connected to the first portion of the frame; a pair of rear wheel members being pivotally connected to the second portion of the frame; a pair of rear wheels, each said rear wheel being rotatably mounted on one of the rear wheel members; the collapsing mechanism comprising:

means for pivoting the first portion of the frame towards the second portion of the frame or away from the second portion of the frame, means for pivoting including a link rod, the link rod connecting the collapsing mechanism to the first portion of the frame, the link rod moving the first portion of the frame away from the second portion of the frame when the collapsing mechanism is moved towards the first position, and the link rod moving the first portion of the frame towards the second portion of the frame when the collapsing mechanism is moved towards the second position; and means for moving the rear wheels towards the frame or away from the frame.

17. The combination as claimed in claim 16, wherein the collapsing mechanism is moveable between a first position and a second position, the golf cart being in the first configuration when the collapsing mechanism is in the first position and the golf cart being in the second configuration when the collapsing mechanism is in the second position.

18. The combination as claimed in claim 16, wherein the means for moving the rear wheels towards the frame or away from the frame includes a second link rod, the second link rod connecting the collapsing mechanism to one of the rear wheel members, the second link rod moving said one of the rear wheel members away from the frame when the collapsing mechanism is moved towards the first position, and the second link rods moving said one of rear wheel members towards the frame when the collapsing mechanism is moved towards the second position.

19. The combination as claimed in claim 16, further including means for locking the golf cart in the first configuration or in the second configuration.

* * * * *